(12) United States Patent
Van Der Woude et al.

(10) Patent No.: US 6,872,482 B2
(45) Date of Patent: Mar. 29, 2005

(54) LOW-TEMPERATURE FUEL CELL ASSEMBLY AND METHOD FOR THE OPERATION THEREOF

(75) Inventors: Ruud René Van Der Woude, Alkmaar (NL); Maarten Bracht, Amsterdam (NL); Ronald Karel Antoine Maria Mallant, Alkmaar (NL)

(73) Assignee: Stichting Energieonderzoek Centrum Nederland, Le Petten (NL)

( * ) Notice: Subject to any disclaimer, the term of this patent is extended or adjusted under 35 U.S.C. 154(b) by 85 days.

(21) Appl. No.: 10/168,083

(22) PCT Filed: Dec. 18, 2000

(86) PCT No.: PCT/NL00/00927

§ 371 (c)(1),
(2), (4) Date: Oct. 10, 2002

(87) PCT Pub. No.: WO01/45188

PCT Pub. Date: Jun. 21, 2001

(65) Prior Publication Data

US 2003/0104256 A1 Jun. 5, 2003

(30) Foreign Application Priority Data

Dec. 17, 1999 (NL) .............................................. 1013876

(51) Int. Cl.[7] .............................................. H01M 8/18
(52) U.S. Cl. .............................. 429/19; 429/20; 429/17; 429/34
(58) Field of Search .............................. 429/19, 17, 20, 429/26, 13, 34

(56) References Cited

U.S. PATENT DOCUMENTS

| 4,657,828 A | | 4/1987 | Tajima |
| 5,976,724 A | | 11/1999 | Bloomfield |
| 6,277,508 B1 | * | 8/2001 | Reiser et al. ................. 429/17 |
| 6,423,435 B1 | * | 7/2002 | Autenrieth et al. ........... 429/13 |

FOREIGN PATENT DOCUMENTS

| JP | 04 321502 | 11/1992 |
| JP | 05 129029 | 5/1993 |
| JP | 07 235322 | 9/1995 |
| JP | 09 223511 | 8/1997 |
| WO | 00 16426 | 3/2000 |

* cited by examiner

Primary Examiner—Raymond Alejandro
(74) Attorney, Agent, or Firm—Young & Thompson

(57) ABSTRACT

A low-temperature fuel cell assembly including of a low-temperature fuel cell (1) in combination with a sweeping gas circuit (2) for at least the anode part thereof. The fuel gas is prepared by filtering via a semi-permeable wall (5) and the yield from this process is increased by employing sweeping gas. This sweeping gas is obtained by producing it in the sweeping gas circuit (2). During operation some of the sweeping gas is continuously discharged and fresh sweeping gas is continuously produced. With this arrangement it is possible to use hydrogen as fuel gas. Sweeping gas is obtained by injecting air (8) and combusting (9) the oxygen contained therein with hydrogen. It is also possible to perform a methanisation reaction starting from hydrogen as fuel gas by providing $CO/CO_2$ as a result of which the sweeping gas is methane.

17 Claims, 1 Drawing Sheet

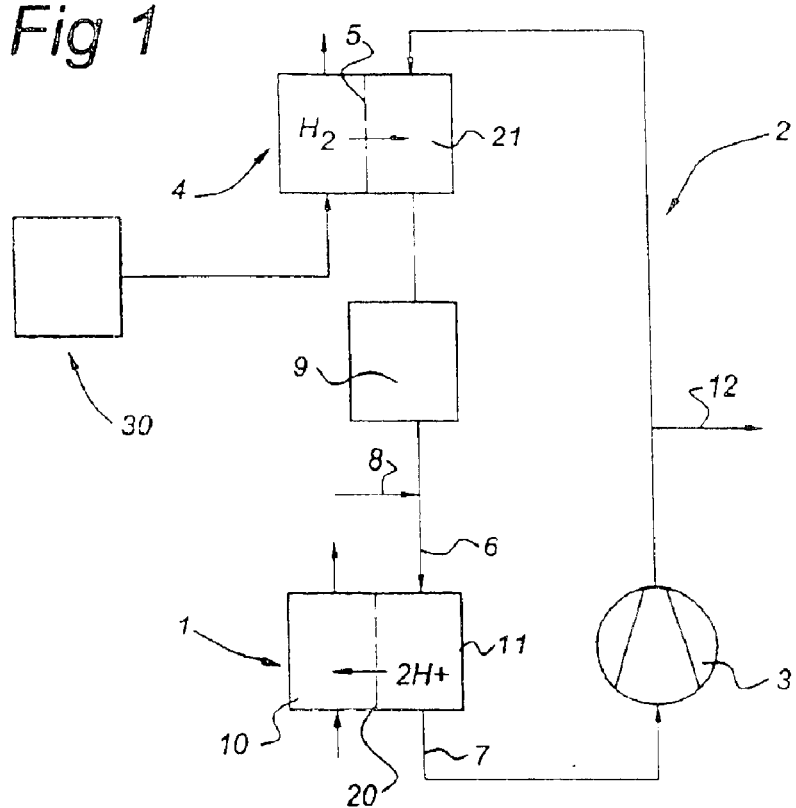
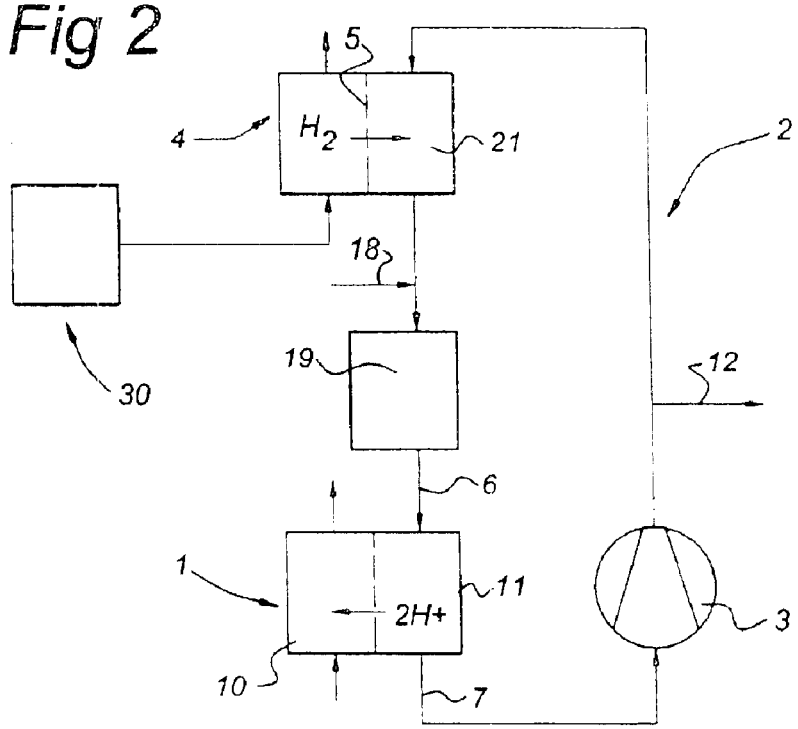

LOW-TEMPERATURE FUEL CELL ASSEMBLY AND METHOD FOR THE OPERATION THEREOF

BACKGROUND OF THE INVENTION

The present invention relates to a low-temperature fuel cell assembly comprising a fuel cell having a sweeping gas circuit for fuel gas, said sweeping gas circuit being connected to the inlet and outlet of the anode of the fuel cell and supply means being provided for fuel, which is connected to said sweeping gas circuit via a physical separation device, means being arranged in the sweeping gas circuit for producing sweeping gas therein.

A low-temperature fuel cell of this type can be an SPFC cell (solid polymer fuel cell), but it must be understood that this term is also understood to cover any other low-temperature fuel cell, such as a phosphoric acid fuel cell. Low temperature is understood to be an operating temperature of below 200° C. In the case of an SPFC cell, the fuel gas used is frequently hydrogen and hydrogen is obtained by a reforming reaction, for example from methane. Admission to the fuel circuit takes place through a semi-permeable wall or corresponding technique such as sorption, hydrogen atoms/molecules being allowed to pass through, but not other gases. In order to optimise the passage through such a semi-permeable wall it is proposed in the prior art to use a sweeping gas in the fuel supply. This sweeping gas must preferably be inert, is not itself consumed in the fuel cell and is largely recycled. It is for this reason that a sweeping gas circuit is present. As a result of the use of the sweeping gas the concentration of hydrogen or other fuel gas is lower and accelerated passage through the semi-permeable wall or other filter will take place, whilst sufficient hydrogen is admitted for operation of the fuel cell.

An assembly of this type is disclosed in U.S. Pat. No. 5,976,724. In this assembly the anode gas is supplied via a semi-permeable membrane to a closed anode circuit. In this assembly water is used as sweeping gas. This sweeping gas is generated by evaporation of water present in the circuit as a liquid, which is condensed before entry into the anode.

As far as the sweeping gas is concerned, such a circuit is completely closed. It has been found that poisoning of the sweeping gas occurs during long-term use of such a fuel cell assembly, as a result of which the efficiency of the fuel cell falls (dramatically).

SUMMARY OF THE INVENTION

The aim of the present invention is to avoid this disadvantage.

Said aim is achieved with an assembly as described above in that the means comprise chemical reactor means having an inlet for one component of said chemical reaction and in that the sweeping gas circuit is provided with a sweeping gas discharge.

According to the present invention it is proposed to replace the sweeping gas discharged by sweeping gas that has been produced in the sweeping gas circuit by chemical means. That is to say, no separate (initial) supply of sweeping gas is required. As a result, such a low-temperature fuel cell assembly can be of appreciably simpler construction with corresponding consequences for the cost price thereof and the operation thereof, as a result of which the operating costs will further decrease.

The production of the sweeping gas takes place depending on the sweeping gas used.

It is noted out that PCT application WO 001/16426, which has not been published on the priority date of this application, discloses an assembly in which a fuel gas is fed to a sweeping gas circuit without a physical separation device, such as a semi-permeable membrane. Carbon monoxide is removed by a chemical reaction. All fuel present in the sweeping gas circuit is immediately combusted stoichiometrically and the water liberated during this combustion is discharged. In the case of the present invention unconsumed anode fuel is preferably circulated so that this can still be usefully used at a later stage. Anode fuel gas is additionally consumed only to make up the quantity of sweeping gas that has been removed and removal of sweeping gas takes place for the reasons mentioned above.

According to a first particular embodiment of the invention, air (optionally exclusively oxygen) is introduced into the sweeping gas circuit. At this point the fuel cell is still not in operation. Gas, in particular hydrogen, originating from the reforming device or other hydrogen generator reacts in a controlled manner with this air in a burner present in the sweeping gas circuit. During this reaction oxygen present in the air is converted to water vapour and carbon monoxide which is produced during this reaction and/or may be present is converted to carbon dioxide. The mixture consisting of water vapour, carbon dioxide and nitrogen is found to function exceedingly well as a sweeping gas. The cell is then brought into operation.

Because, for example, the selective effect of the semi-permeable membrane or other filter in the reforming device is not complete, in the majority of cases it cannot be precluded that carbon monoxide or other harmful substances are present in the fuel gas during the progressive operation of the fuel cell. Carbon monoxide is particularly harmful for the anode. Any platinum present in the fuel cell is poisoned by carbon monoxide.

According to the invention it is proposed to remove a small amount of sweeping gas continually during operation of the fuel cell in order to prevent accumulation of undesired gases. This amount is compensated for by the continual introduction of a small amount of air. This amount of air reacts with the fuel gas (hydrogen). This can optionally be carried out in the abovementioned burner. In this context it is preferable that the introduction of air takes place upstream of the anode inlet. As a result of the presence of air, more particularly oxygen, any carbon monoxide present can be converted to carbon dioxide, which is harmless for the fuel cell.

Instead of using a mixture of water vapour, $CO_2$ and nitrogen as sweeping gas, it is possible to use methane as sweeping gas. A combination with the gases described above is optionally possible.

Methane can be obtained in the sweeping gas circuit by converting the $CO/CO_2$ present therein or fed thereto to methane with the aid of methanising means. These methanising means make it possible to obtain methane and water vapour from hydrogen and carbon monoxide/carbon dioxide. With this embodiment there is a lesser need to remove sweeping gas continually during the process because any carbon monoxide present in the fuel gas is immediately converted to methane in the methanising means. Discharge may be needed in connection with other harmful gases and to prevent too much methane being present in the circuit.

The construction according to the invention makes it possible to increase the efficiency of fuel cell assemblies appreciably, that is to say fuel cells in combination with reformers, because a sweeping gas circuit can be used. On the other hand, the construction is not particularly complex because the sweeping gas is produced in the system itself prior to start-up thereof and during operation of the fuel cell.

BRIEF DESCRIPTION OF THE DRAWINGS

The invention will be explained in more detail below with reference to illustrative embodiments shown in the drawing. In the drawing:

FIG. 1 shows a block diagram of a first embodiment of the assembly according to the invention where air is used as sweeping gas; and FIG. 2 shows an assembly according to FIG. 1, where methane is used as sweeping gas.

DESCRIPTION OF THE PREFERRED EMBODIMENTS

In FIG. 1 a solid polymer fuel cell is indicated by 1. This fuel cell consists of a cathode side 10 and an anode side 11 separated by an electrolyte 20. In the context of the present invention only the anode side 11 is of importance. This anode side has an inlet 6 and an outlet 7. The fuel cell shown here is preferably operated on hydrogen. Hydrogen originates from a reforming device 30 to which, for example, natural gas or other gas is supplied. With this arrangement hydrogen is formed by a reaction, but before admitting this hydrogen to the inlet 6 of the anode filtering is necessary in order to separate off any undesired gases present. Separation takes place in receiving section 4 with a semi-permeable membrane 5. In order as far as possible to promote the transfer of hydrogen through this semi-permeable membrane 5, the concentration thereof on the permeate side 21 must be as low as possible. This is achieved by the presence of a sweeping gas in a sweeping gas circuit 2. The sweeping gas is enriched with hydrogen on the permeate side 21 and then fed through the anode and here (some) hydrogen but no sweeping gas is consumed. On the one hand it is possible by this means to supply sufficient hydrogen to the anode 11 of the fuel cell 1 but, on the other hand, the concentration when fed to the permeate side 21 is so low that transfer of hydrogen through the semi-permeable membrane 5 is promoted as far as possible.

An air feed is indicated by 8. An advantageous embodiment is one in which cathode discharge gas with a low oxygen content is used for this, as a result of which less hydrogen is consumed and the system efficiency increases. 9 indicates a burner. 3 is a pump for maintaining the circulation of the sweeping gas, whilst 12 is a selectively operated discharge for the sweeping gas. Operation of the discharge is dependent on the contamination in the circuit and supply of air is dependent on the operation of the discharge.

The fuel cell assembly described above functions as follows:

Before putting the assembly into operation it is first necessary to produce sweeping gas. To this end air is admitted via inlet 8. As soon as the circuit has been filled, the supply of air is terminated or substantially reduced. At the same time the reforming device 30 is put into operation, as a result of which hydrogen is introduced via the semi-permeable membrane 5 into the sweeping gas circuit 2. Hydrogen and oxygen present in the air (and any carbon monoxide present) are combusted in a controlled manner in burner 9. The mixture produced from this constitutes the sweeping gas. This sweeping gas is then continuously circulated by pumping. Hydrogen gas that passes into the sweeping gas circuit can now be used for the reaction in fuel cell 1. In order to prevent contamination of the sweeping gas circuit with gases which are not consumed in the fuel cell but do accumulate, the outlet 12 is operated continuously or periodically. Sweeping gas containing harmful components is discharged by this means. During operation, fresh sweeping gas can also be prepared by reaction in the fuel cell by allowing restricted feed of air via inlet 8.

FIG. 2 shows the same assembly as in FIG. 1 except that the $CO/CO_2$ feed is indicated by 18 and a methanising device is indicated by 19. Methane is now used as sweeping gas instead of air. This methane is produced by converting $CO/CO_2$ to methane with the aid of hydrogen.

Here again, preparation of the sweeping gas first takes place on starting up the cell. In this case the sweeping gas methane is prepared in the methanising device 19 as indicated above by reaction of hydrogen from the reforming device and $CO/CO_2$ which is present or is supplied. An embodiment with which the $CO/CO_2/H_2$ mixture can be supplied by the reforming device is advantageous. After sufficient methane has been prepared, the sweeping gas circuit is set in operation by pump 3 and hydrogen prepared in the reforming device can then be used on the anode side of the fuel cell. Any carbon dioxide/carbon monoxide produced during the process is immediately converted to methane in the methanising device 19 by the hydrogen present. Consequently there is less necessity for topping up $CO/CO_2$ via inlet 18 for conversion to methane. However, discharge can be necessary because of the presence of other components in the sweeping gas which are undesirable and must not be allowed to accumulate.

Although the invention has been described above with reference to a preferred embodiment, it will be understood by those skilled in the art that numerous variations are possible which are obvious after reading the above description and which fall within the scope of the appended claims.

What is claimed is:

1. A low-temperature fuel cell assembly comprising:
   a fuel cell having an anode and a sweeping gas circuit for fuel gas,
   said sweeping gas circuit having a gas flow direction and being connected to an inlet and an outlet of the anode;
   a fuel supply means connected to said sweeping gas circuit via a physical separation device (5);
   producing means (8, 9; 18, 19) being arranged in the sweeping gas circuit for producing sweeping gas therein,
   the producing means (8, 9; 18, 19) comprising chemical reactor means having an inlet for one component of a chemical reaction to produce the sweeping gas and to convert carbon monoxide to carbon dioxide,
   said chemical reactor means arranged upstream, in the direction of said gas flow, of said anode and downstream of said physical separation device,
   wherein the sweeping gas circuit is provided with a sweeping gas discharge (12).

2. The low-temperature fuel cell assembly according to claim 1, wherein said producing means comprise an air feed (8) and said chemical reactor means comprise a burner (9).

3. The low-temperature fuel cell assembly according to claim 2, wherein said burner comprises a catalyst.

4. The low-temperature fuel cell assembly according to claim 1, wherein said chemical reactor means comprise methanising means (19) for converting a carbon and oxygen gas to methane in the presence of hydrogen.

5. The low-temperature fuel cell assembly according to claim 4, wherein said chemical reactor means have a feed (18) for a carbon and oxygen gas.

6. The low-temperature fuel cell assembly according to claim 1, wherein said physical separation device comprises a semi-permeable wall (5).

7. A method for operating a low-temperature fuel cell assembly comprising an SPFC cell and a sweeping gas circuit having a gas flow direction, in which the anode and means for introducing a fuel gas are accommodated, said fuel gas being subjected to a physical separation operation before introduction into the sweeping gas circuit and a sweeping gas being produced in the sweeping gas circuit while putting the fuel cell into operation, characterised in that the sweeping gas is produced by a chemical reaction and the sweeping gas is discharged during operation of the fuel cell said sweeping gas being produced downstream from said physical separation operation and upstream from said anode.

8. The method according to claim 7, wherein the fuel gas is hydrogen.

9. The method according to claim 8, wherein the sweeping gas is produced by introducing air and allowing the oxygen present therein to react with hydrogen.

10. The method according to claim 8, wherein the sweeping gas is produced by providing a carbon and oxygen gas and allowing this to react with hydrogen to give methane.

11. A low-temperature fuel cell, comprising:
- a fuel cell including a cathode side (11) and an anode side (10) separated by an electrolyte;
- a fuel inlet (6) and a fuel outlet (7) located on the anode side;
- a fuel reforming device providing a fuel for the fuel cell, the fuel entering the fuel cell at the fuel inlet;
- a receiving section (4), located downstream of the fuel reforming device and upstream of the fuel cell inlet, to filter and separate off undesired gases from the fuel of the fuel reforming device;
- a sweeping gas circuit (2) connected to an inlet of the receiving station and providing a sweeping gas that is enriched with the fuel on passing through a permeate side of the receiving section and discharged through an outlet of the receiving station;
- a connecting line connecting the outlet of the receiving station to the inlet of the anode side of the fuel cell to transport the fuel enriched sweeping gas to the inlet of the anode side of the fuel cell, and
- a producing means comprising a chemical reactor having an inlet for one component of a chemical reaction to produce the sweeping gas and to convert carbon monoxide to carbon dioxide, said chemical reactor arranged along the connecting line upstream of said anode and downstream of said receiving station.

12. The fuel cell of claim 11, wherein, the fuel is hydrogen, the fuel enriched sweeping gas is a sweeping gas enriched in hydrogen.

13. The fuel cell of claim 12, further comprising an air feed connected into the connecting line.

14. The fuel cell of claim 12, wherein the chemical reactor comprises a burner that manufactures the sweeping gas from hydrogen and oxygen present in the air.

15. The fuel cell of claim 11, further comprising an oxygen-based gas feed line connected into the connecting line.

16. The fuel cell of claim 15, wherein, the chemical reactor is a methanising device that manufactures the sweeping gas by converting a gas, feed from the gas feed line, to methane.

17. The fuel cell of claim 11, wherein the receiving section (4) comprises a semi-permeable membrane.

* * * * *